United States Patent
De Dinechin et al.

(10) Patent No.: US 10,522,260 B2
(45) Date of Patent: Dec. 31, 2019

(54) COOLING ELEMENT WITH BASE FOR DISCHARGING HEAT FROM A PACKAGE

(71) Applicant: TN International, Montigny le Bretonneux (FR)

(72) Inventors: Guillaume De Dinechin, Issy les Moulineaux (FR); Loïc Palomar, Massy (FR); Hervé Ripert, Paris (FR)

(73) Assignee: TN INTERNATIONAL, Montigny le Bretonneux (FR)

(*) Notice: Subject to any disclaimer, the term of this patent is extended or adjusted under 35 U.S.C. 154(b) by 0 days.

(21) Appl. No.: 15/768,797

(22) PCT Filed: Oct. 13, 2016

(86) PCT No.: PCT/EP2016/074561
§ 371 (c)(1),
(2) Date: Apr. 16, 2018

(87) PCT Pub. No.: WO2017/064174
PCT Pub. Date: Apr. 20, 2017

(65) Prior Publication Data
US 2018/0308596 A1    Oct. 25, 2018

(30) Foreign Application Priority Data
Oct. 16, 2015 (FR) ....................... 15 59894

(51) Int. Cl.
*G21F 5/008* (2006.01)
*G21F 5/10* (2006.01)

(52) U.S. Cl.
CPC ............... *G21F 5/10* (2013.01); *G21F 5/008* (2013.01)

(58) Field of Classification Search
USPC .................................................. 250/506.1
See application file for complete search history.

(56) References Cited

U.S. PATENT DOCUMENTS

| | | | | |
|---|---|---|---|---|
| 3,727,059 A | * | 4/1973 | Reese | G21F 5/005 250/506.1 |
| 4,339,411 A | * | 7/1982 | Knackstedt | G21F 5/10 376/272 |

(Continued)

FOREIGN PATENT DOCUMENTS

| | | |
|---|---|---|
| DE | 40 32 343 A1 | 4/1992 |
| DE | 101 35 650 A1 | 2/2003 |
| EP | 0 087 350 A1 | 8/1983 |

OTHER PUBLICATIONS

International Search Report & Written Opinion for International Application No. PCT/EP2016/074561 dated Jan. 18 2017.

(Continued)

*Primary Examiner* — Phillip A Johnston
(74) *Attorney, Agent, or Firm* — Pearne & Gordon LLP (57) ABSTRACT

The invention concerns a package for transporting and/or storing radioactive materials. The package comprises a wall element (26) and a cooling element (31, 32) attached to the wall element (26) and protruding from the wall element (26) towards the outside of the package. The cooling element (31, 32) comprises a base (40) and at least one fin (35) rigidly connected to the base (40). The base (40) extends to either side of the fin (35) respectively towards two opposing lateral ends of the base, each of the lateral ends being attached to the wall element (26) via a weld.

18 Claims, 5 Drawing Sheets

(56) References Cited

U.S. PATENT DOCUMENTS

| | | | |
|---|---|---|---|
| 6,839,395 B2 * | 1/2005 | Ohsono | G21F 5/10 376/272 |
| 2014/0035196 A1 | 2/2014 | Ripert et al. | |
| 2017/0047134 A1 | 2/2017 | Collin et al. | |

OTHER PUBLICATIONS

Preliminary French Search Report for International Application No. PCT/EP2016/074561 dated Jul. 5, 2016.

* cited by examiner

COOLING ELEMENT WITH BASE FOR DISCHARGING HEAT FROM A PACKAGE

TECHNICAL FIELD

The invention relates to a package for storing and/or transporting radioactive materials, such as fresh or irradiated nuclear fuel assemblies. It is concerned in particular with attaching a cooling element to an outer wall element of the package.

STATE OF PRIOR ART

A package for transporting and/or storing radioactive materials comprises a side body closed at its two longitudinal ends by a bottom and a lid respectively.

The side body comprises a plurality of cooling elements which project from outer wall elements outwardly from the package. These cooling elements are often very close to each other along a circumferential direction of the package.

The cooling elements are in particular attached by welding to the wall elements. But, some welding methods generate a risk of damaging/severing the cooling elements, in particular in proximity of their base. Other welding methods have the risk of deteriorating the outer wall elements.

DISCLOSURE OF THE INVENTION

The invention aims at solving at least partially the problems met in solutions of prior art.

In this regard, one object of the invention is a package for transporting and/or storing radioactive materials such as nuclear fuel assemblies.

The package comprises a wall element and a cooling element attached to the wall element. The cooling element projects from the wall element outwardly from the package. The cooling element comprises a base and at least one fin which is integral with or fixed to the base.

According to the invention, the base extends on either side of the fin respectively towards two opposite side ends of the base, each of the side ends being attached to the wall element via a weld.

The base enables the weld metal zone to be moved away from the fin base, upon attaching the cooling element to the wall element. Thus, the risk of damaging/severing the fin is reduced, when using known welding methods with an intensive and localised heat input such as a laser beam or electron beam welding.

In addition, such welding methods limit the rise in temperature of the wall element upon welding, as well as the risks of irreversibly deforming the wall element resulting therefrom by plastic shrinkage.

Consequently, the invention reduces the risks of damaging the cooling element, while limiting deformations of the wall element upon attaching the cooling element to the wall element.

The invention can optionally include one or more of the following characteristics combined to each other or not.

Advantageously, the wall element comprises a housing in which the base is arranged, at least one of the side ends of the base being connected to at least one side edge of the housing via a weld.

The heat conduction between the base and the wall element is thereby facilitated.

According to a particular embodiment, the base is housed in the housing so as to be flush with the surface of the wall element at least at one edge of the housing.

As a result, there is a better attachment of the cooling element and a better heat conduction between the cooling element and the wall element.

Advantageously, the base height along at least one of the side ends is higher than or equal to half the mean thickness of the fin.

The heat conduction between the base and the wall element is thereby improved.

According to an advantageous embodiment, the wall element, the base and/or the fin comprise copper.

The copper allows a suitable heat conduction but the wall element, the base and/or the fin are further likely to be plastically deformed.

Advantageously, the base and the fin are integrally formed as a single piece.

Thereby, they are rather easy to manufacture, while better discharging heat off the package.

According to another advantageous embodiment, the package comprises a neutron shield block and at least one heat conduction inner element, the wall element being rigidly integral with or fixed to the heat conducting inner element, the heat conducting inner element being in contact with a ferrule of the package, the ferrule, the heat conducting inner element and the wall element surrounding at least partially the neutron shield block.

According to another particular embodiment, the cooling element comprises at least two fins and a base common to the fins, the base extending on either side of the fin towards two opposite side ends of the base, each of the ends being attached to the wall element via a weld.

Thereby, the manufacture of the package is easier, because of the common base.

According to another advantageous embodiment, the package comprises a second cooling element attached to the wall element, the second cooling element comprising at least one fin which is integral with or fixed to the base, the distance between the cooling elements being lower than the height of at least one of the fins.

The number and density of the cooling elements make the package difficult to make, while offering a proper heat discharge.

The invention is also concerned with a heat conduction element for a package for transporting and/or storing radioactive materials, comprising:

a heat conducting inner element, at least one cooling element, and a wall element for forming an outer shell portion of the package, the heat conducting inner element and the cooling element being located on either side of the wall element which mechanically and thermally connects them, the cooling element comprising a base and at least one fin which is integral with or fixed to the base.

According to the invention, the base extends on either side of the fin respectively towards two side ends opposite to the base, each of the side ends being attached to the wall element via a weld.

The invention also relates to a method for manufacturing a package for transporting and/or storing radioactive materials such as defined above.

According to the invention, the method comprises a step of welding each of both opposite side ends of the base to the wall element.

Advantageously, the width of the base between its two side ends is higher than or equal to twice the mean thickness of the fin.

The risk of severing the fins is further reduced by further moving the weld metal zone from the fin base, upon attaching the cooling element to the wall element.

According to a particular embodiment, the base is welded to the wall element by electron beam or laser beam welding.

According to another particular embodiment, the base is arranged in a housing provided in the wall element, the base being welded in the housing along a thermal contact interface, the thermal contact interface being tilted at an angle between 0° to 30° with respect to the height direction of the fin.

Attaching the cooling element to the base is improved, while promoting heat exchanges between the base and the cooling element.

According to an advantageous embodiment, the manufacturing method comprises a step of making notches in a plate to form fins of the cooling element, the notches being spaced from each other along the longitudinal direction of the plate.

Advantageously, the plate comprises the base of the cooling element. The step of welding the side ends of the base along the longitudinal direction of the plate occurs after the step of making the notches.

Preferably, the method comprises a step of twisting the fins about their longitudinal axis after the welding step.

Manufacturing a package with many fins is thereby facilitated.

BRIEF DESCRIPTION OF THE DRAWINGS

The present invention will be better understood upon reading the description of exemplary embodiments, given by way of purely indicating and in no way limiting purposes, making reference to the appended drawings in which.

DETAILED DISCLOSURE OF PARTICULAR EMBODIMENTS

Identical, similar or equivalent parts of the different figures bear the same reference numerals so as to facilitate switching from one figure to the other.

Figure 1:
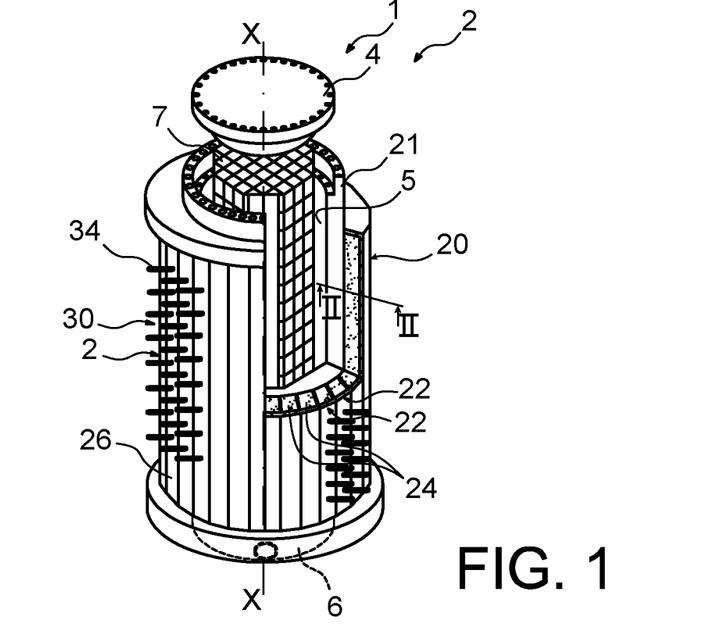
FIG. 1 is a partly perspective and partly cross-section representation of a package for transporting and/or storing nuclear fuel assemblies, according to a first embodiment of the invention.

FIG. 1 represents a package 2 for transporting and/or storing radioactive materials such as nuclear fuel assemblies.

The package 2 comprises a side body 20 delimited radially inwardly by a steel ferrule 21 and radially outwardly by heat conductive elements 22.

The side body 20 extends along a longitudinal axis X-X of the package. The package is closed on either side of the side body 20 along the longitudinal direction X-X by a lid 4 and by a bottom 6.

In the present document and unless otherwise indicated, the adjective "longitudinal" means substantially parallel to the longitudinal axis X-X, the adjective "radial" means oriented along a direction substantially orthogonal to this axis and the adjective "transversal" means along a plane substantially orthogonal to the longitudinal axis X-X. The term "circumferential" designates a direction about the longitudinal axis X-X.

The ferrule 21 delimits an inner cavity 5 of the package 2 inside which a basket 7 is housed to store nuclear fuel assemblies inside the package 2.

The package 2 and the basket 7 housed in the package 2 define a container 1 for transporting and/or storing radioactive materials.

The heat conducting elements 22 each comprise a wall element 26 and at least one cooling element 30 which is welded to an outer surface $S_1$ of the wall element 26. The heat conductive element 22 is made of copper or one of its alloys because of its high heat conductivity.

Figure 2:
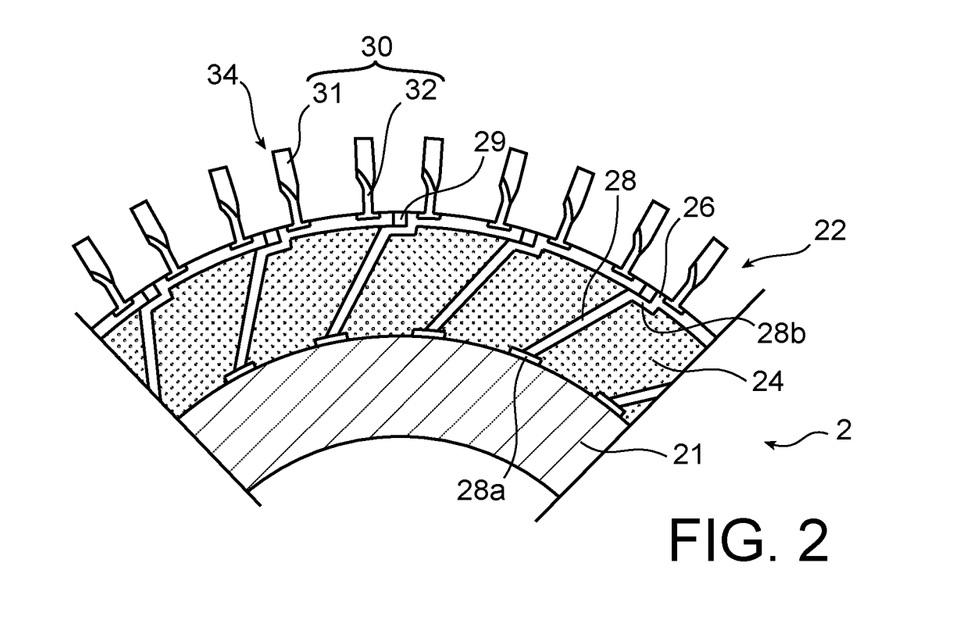
FIG. 2 is a partial transverse cross-section representation of the package, according to the first embodiment.
Figure 3:
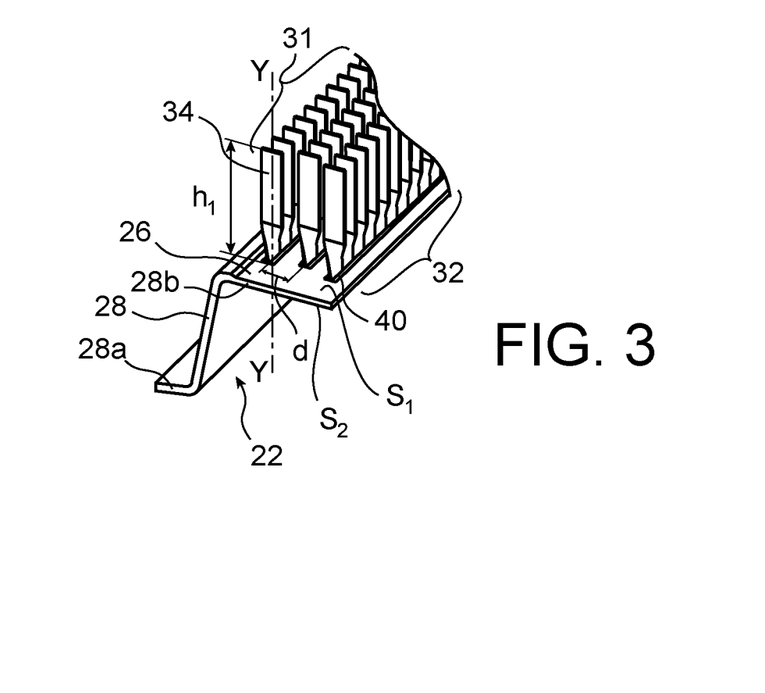
FIG. 3 is a partial elevation representation of a heat conductive element of the package according to the first embodiment.

In FIG. 2, each heat conductive element 22 is represented along a circumferential direction with two cooling elements 30 for the sake of visibility. In FIG. 3, the heat conductive element 22 is represented with three cooling elements 30 including a first cooling element 31 and a second cooling element 32.

The heat conductive elements 22 thus each include a heat conducting inner element 28 which is bent at its first end 28a and which is connected to the inner surface $S_2$ of the wall element 26 at its second end 28b opposite to the first end 28a.

The first ends 28a are attached to the ferrule 21, for example by welding. As can be seen in FIG. 2, the wall elements 26 are connected to each other by welds 29, so as to form an outer wall of the package 2.

The cooling elements 30 radially project from the wall element 26 outwardly from the package 2, whereas the heat conducting inner element 28 projects from the wall element 26 inwardly from the package 2. In other words, the cooling elements 30 and the heat conducting inner elements 28 are radially located on either side of the wall elements 26.

The heat conducting elements 22 each enclose a neutron shield block 24 inside the side body 20. This neutron shield block 34 is located, along the circumferential direction, between two consecutive heat conducting inner elements 28. It is located along the radial direction between the ferrule 21 on the one hand and the wall element 26 of the heat conductive element 22 on the other hand.

In reference more specifically to FIG. 3 and to the first embodiment, the cooling elements 30 each comprise a plurality of fins 34 which are spaced from each other along the longitudinal direction X-X of the package 2 and which extend along a radial direction Y-Y. On the other hand, the fins 34 are each twisted about their longitudinal axis Y-Y.

Each of the cooling elements 30 comprises a single base 40 which is common to its fins 34 and from which the fins 34 radially extend. The base 40 extends substantially continuously along the longitudinal direction X-X over the entire length of the cooling element 30.

More generally, the distance "d" between two consecutive cooling elements 31, 32 is lower than the height $h_1$ of the fins 34, which allows heat to be properly discharged off the package 2. However, the low distance "d" between the cooling elements 30 relative to their height $h_1$ tends to make the package 2 more difficult to manufacture.

The heat is discharged off the container 1 from the ferrule 21, successively through the heat conducting inner elements 28, the wall elements 26 and possibly the cooling elements 30.

Figure 4:
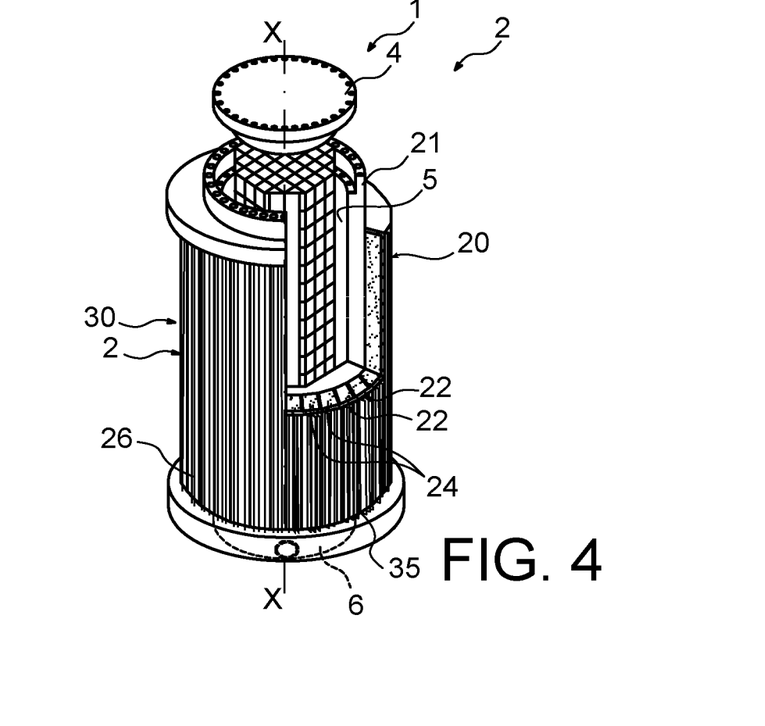
FIG. 4 is a partly perspective and partly cross-section view of a package, according to a second embodiment of the invention.
Figure 5:
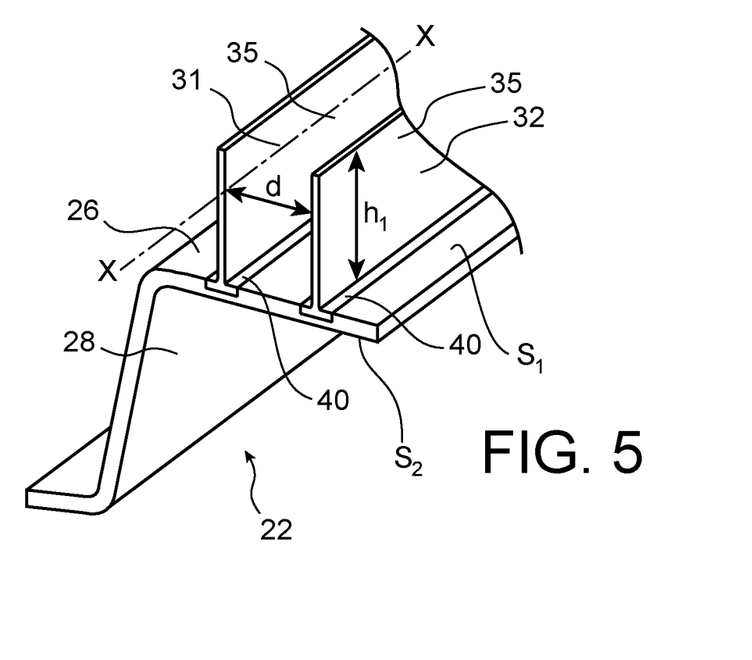
FIG. 5 is a partial elevation representation of a heat conductive element of the package, according to the second embodiment.

FIGS. 4 and 5 represent a container 1 for transporting and/or storing radioactive materials which is distinguished from the container 1 according to the first embodiment by the structure of the cooling elements 30.

In the second embodiment, the cooling elements 30 each comprise a single plate-shaped fin 35. This fin 35 substantially extends over the entire length of the package 2 along the longitudinal direction X-X.

The base 40 extends substantially continuously along the longitudinal direction X-X over the entire length of the cooling element 30.

The distance "d" between two consecutive fins 31, 32 is substantially identical to that between two consecutive fins 34 of the first embodiment.

The number of cooling elements 30 of the package 2 according to the second embodiment is substantially identical to the number of cooling elements 30 of the package 2 according to the first embodiment. Only two cooling elements 30 have been represented in FIG. 5 for the sake of clarity.

In reference both to the first and the second embodiment, each of the cooling elements 30 includes at least one fin 34, 35 and the base 40. The cooling element 30 is connected to the wall element 26 at the base 40.

Figure 6:
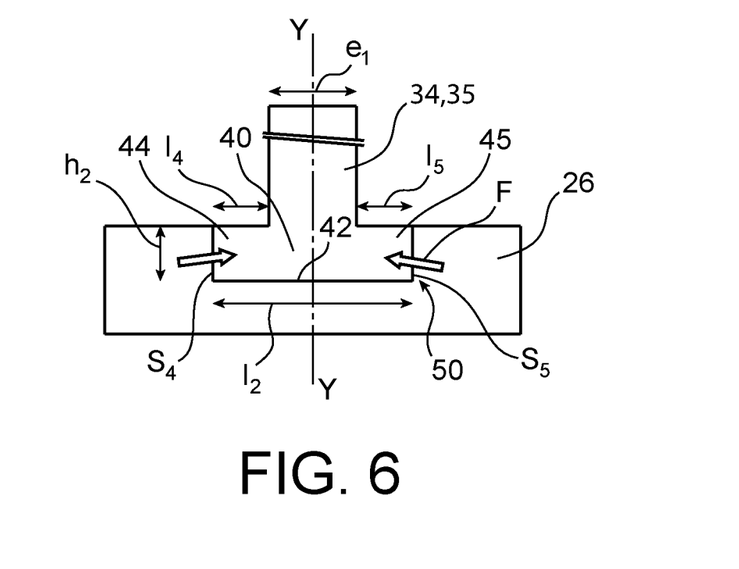
FIG. 6 is a partial transverse cross-section representation of a cooling element of the package, according to the first or the second embodiment.

In reference to FIG. 6, the base 40 comprises a first side end 44 and a second side end 45 opposite to the first side end 44. The fin 34, 35 is located between the side ends 44, 45.

In the first and the second embodiment, the side surfaces delimiting the side ends 44, 45 are substantially orthogonal to the bottom 42 of the base. The bottom 42 of the base is substantially orthogonal to the axis Y-Y of the fin 34, 35.

The width of the base $I_2$, taken between its side ends 44, 45 is about twice the mean thickness $e_1$ of the fin 34, 35. The width $I_4$ of the first end 44 is substantially equal to the width $I_5$ of the second end 45. The height $h_2$ of the base is higher than or equal to half the thickness $e_1$ of the fin 34, 35.

The base 40 is housed in a groove 50 made in the wall element 26. This groove 50 substantially extends along the longitudinal direction X-X of the package 2. It forms a recess made in the outer surface $S_1$ of the wall element 26.

The base 40 is housed in the groove 50 so as to be flush with the surface of the wall element 26. In other words, the height $h_2$ of the base 40 is substantially equal to the height $h_3$ of the groove 50, which promotes heat exchanges between the bottom of the groove 52 and the bottom 42 of the base 40 by contact.

Figure 8:
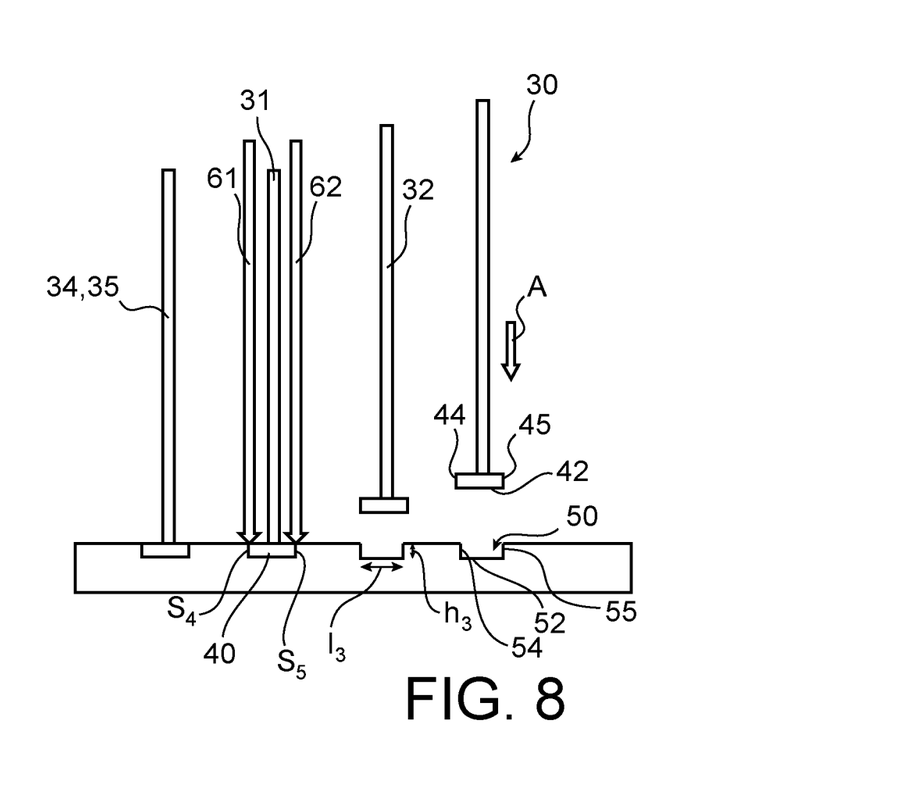
FIG. 8 illustrates at least partially the implementation of the method for manufacturing the package, according to the first or the second embodiment.

As can be seen in FIG. 8, the groove 50 is delimited sideways by a first side edge 54 and by a second side edge 55 opposite to the first side edge 54.

The first side edge 54 is intended to be in mechanical contact with the first side end 44 of the base along a first heat exchange interface $S_4$ via a first weld. The first side edge 54 has a shape substantially complementary to that of the first side end 44. The first weld extends throughout the first side edge 54, which promotes heat exchanges between the wall element 26 and the fin 34, 35.

The second side edge 55 is intended to be in mechanical contact with the second side end 45 of the base along a second heat exchange surface $S_5$ via a second weld. The second side edge 55 has a shape substantially complementary to that of the second side end 45. The second weld extends substantially throughout the second side edge 55, which promotes heat exchanges between the wall element 26 and the fin 34, 35 which are represented by the arrow F.

The first weld and the second weld are the only welds of the base 40 to the wall element 26. They are made without filler material.

The groove 50 has a width $I_3$ between its side edges 54, 55 which is substantially equal to the width $I_2$ of the base 40 by taking the first weld and the second weld into account, in order to promote heat exchanges between the wall element 26 and the cooling element 30.

Figure 7:
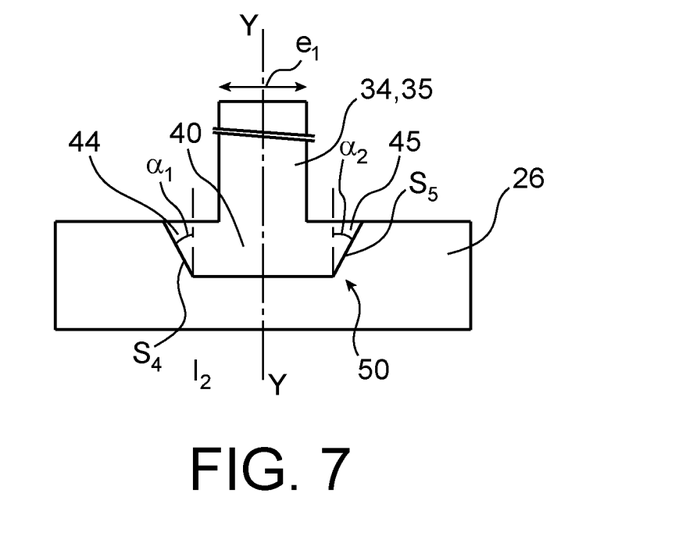
FIG. 7 is a partial transverse cross-section representation of an alternative embodiment of the cooling element and the wall element.

FIG. 7 represents an alternative embodiment in which the first side end 44 has a frustoconical shape forming an angle $\alpha_1$ with the axis Y-Y of the fin 34, 35 and the second side end 45 has a frustoconical shape forming an angle $\alpha_2$ with the axis Y-Y of the fin 34, 35. The angle $\alpha_1$ is substantially equal to the angle $\alpha_2$ and about 30° at most, in order to facilitate attaching the base 40 to the side edges 54, 55 of the groove, while ensuring a suitable heat conduction between the wall element 26 and the cooling element 30.

The method for manufacturing the package 2 according to the first or the second embodiment is illustrated in reference to FIG. 8.

The cooling elements 30 are attached to the wall element 26 by welding with an intensive and localised heat input such as a laser beam or electron beam welding.

These welding methods are in particular favoured with respect to the arc welding which requires to pre-heat the wall element 26 and/or the cooling element 30 with the risk of irreversibly deforming them by plastic shrinkage.

The cooling element 30 is first placed into the groove 50 of the wall element 26 so as to be flush with the surface of the wall element 26, as illustrated by the arrow A.

Then, the cooling element 30 is attached at its first side end 44 to the first side edge 54 by a first welding beam 61, so as to make the first weld along the first heat contact interface $S_4$.

Concomitantly or after making the first weld, the cooling element 30 is attached at its second side end 45 to the second side edge 55 by a second welding beam 62, so as to make the second weld along the second heat contact interface $S_5$.

Welding the cooling element 30 at the side ends 44, 45 of the base enables the welding beams 61, 62 to be moved away from the fin 34, 35, which limits the risks of severing it upon welding. The welding beams 61, 62 are in particular substantially parallel to the axis Y-Y of the fin 34, 35.

The cooling elements 30 are welded one after the other on the wall element 26 along the circumferential direction of the package 2. A second cooling element 32 is only attached to the wall element 26 when the first cooling element 31 immediately adjacent thereto has been attached to the corresponding wall element 26 over the entire length of this cooling element 31.

Figure 9:
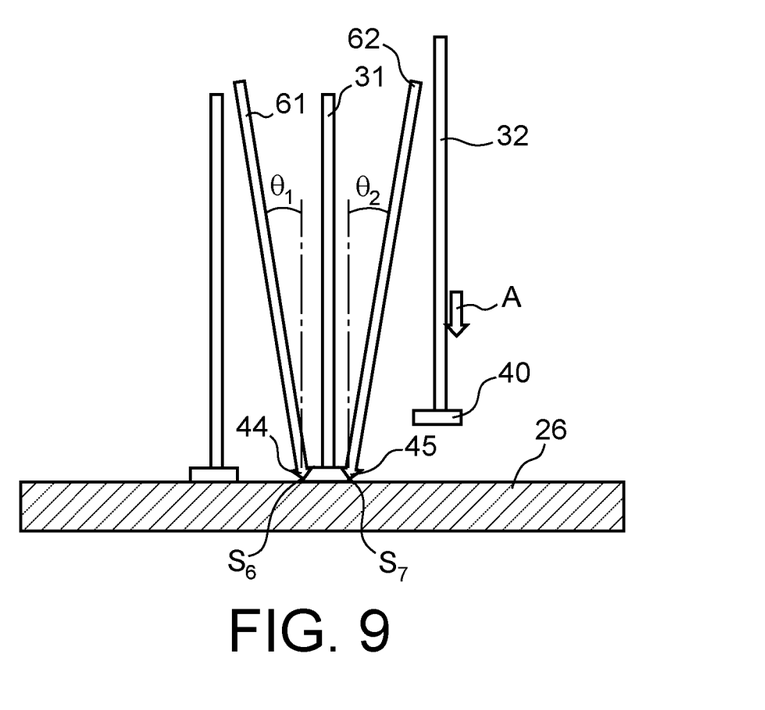
FIG. 9 illustrates at least partially the implementation of an alternative embodiment of the method for manufacturing a package.

FIG. 9 illustrates the manufacture of a package 2 for transporting and/or storing radioactive materials according to a third embodiment. The cooling elements 30 of this package each include either a plurality of fins 34 spaced along the longitudinal direction X-X, according to the first embodiment, or a single plate-shaped fin 35, as in the second embodiment.

The manufacturing method according to FIG. 9 is distinguished from the manufacturing method according to FIG. 8 in that the base 40 of each cooling element 30 is not housed in a groove 50. On the contrary, the base 40 is welded to the uniformly planar surface of the wall element 26.

The cooling element 30 is attached at its first side end 44 by the first welding beam 61, along a third heat contact interface $S_6$.

The cooling element 30 is attached at its second side end 45 by a second welding beam 62, along a fourth heat contact interface $S_7$.

The third heat contact interface $S_6$ and the fourth heat contact interface $S_7$ result from the side ends 44, 45 of the base 40 molten on the wall element 26.

The welding beams are preferably substantially parallel with respect to the axis Y-Y of the at least one fin 34, 35 of the cooling element 30. The angle $\theta_1$ of the first welding beam 61 with the axis Y-Y is in particular between 0° and 30°. The angle $\theta_2$ of the second welding beam 62 with the axis Y-Y is in particular between 0° and 30°. The angle $\theta_1$ is substantially identical to the angle $\theta_2$.

Figure 10:
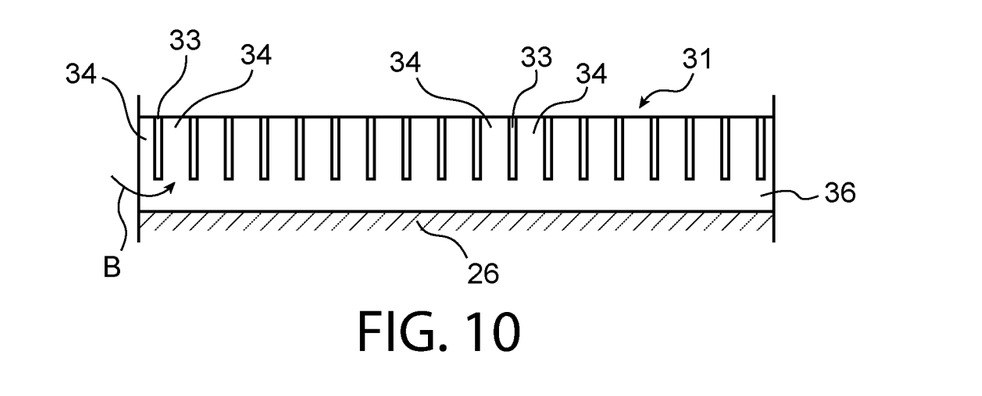
FIG. 10 illustrates the manufacture of a plurality of fins upon manufacturing a package, according to the first embodiment.

FIG. 10 illustrates the manufacture of the fins 34 of one of the cooling elements 30 of the package 2 according to the first embodiment.

First, the manufacturing method comprises a step of making notches 33 in a plate 36 so as to form fins 34. This plate 36 is of an analogous shape as that of the cooling element 30 according to the second embodiment. The notches 33 are evenly spaced from each other along the longitudinal direction X-X. In this step, the fins 34 each have a rectangular shape.

The notched cooling element 30 is then welded to the wall element 26 substantially over the entire length of the cooling element 30.

The fins 34 are then twisted along the arrow B, preferably each in the same direction, about their longitudinal axis Y-Y, so as to increase the spacing between two consecutive fins 34. The heat conducting element 22 is then substantially identical to that represented in FIG. 3 in reference to the first embodiment.

Of course, various modifications can be made by those skilled in the art to the invention just described without departing from the scope of the disclosure of the invention.

The packages 2 have a substantially cylindrical side body 20. However, the side body 20 can assume other suitable shapes, such as a hexagonal shape.

The heat conductive elements 22 represented can comprise a single cooling element 30, two cooling elements 30 to three cooling elements 30 or more. However, the distance "d" between the cooling elements 30 is preferably lower than the height $h_1$ of the fins 34, 35.

In the embodiments represented, the cooling elements 30 each extend substantially along the longitudinal direction X-X of the package 2 but it is intended that they can be tilted with respect to the longitudinal axis X-X. The cooling elements 30 remain preferably substantially parallel to each other.

In the embodiments represented, the base 40 is substantially symmetrical through planar symmetry passing through the axis Y-Y of the fin 34, 35 of the cooling element. However, it could be dissymmetrical with respect to this plane.

In reference to FIG. 10 and to manufacturing the package according to the first embodiment, the notches 33 can be made only once the cooling element 30 has been welded to the wall element 26.

In reference to FIG. 6, the bottom 42 of the base 40 can also be welded to the bottom 52 of the groove. The welds can possibly be made with a filler material.

What is claimed is:

1. A package for transporting and/or storing radioactive materials such as nuclear fuel assemblies, comprising:
   an outer wall element, and
   a cooling element which is attached to the outer wall element, wherein the cooling element comprises a base and at least one fin which is integral with or fixed to the base, wherein the fin projects outwardly from the outer wall element and outwardly from the package,
   wherein the base extends on either side of the fin respectively towards two opposite side ends of the base, wherein each of the side ends is attached to the outer wall element via a weld.

2. The package according to claim 1, wherein the outer surface of the outer wall element comprises a recess forming a housing for the base, wherein at least one of the side ends of the base is connected to at least one side edge of the housing via a weld.

3. The package according to claim 2, wherein the base is housed in the housing so as to be flush with the surface of the outer wall element at least at one edge of the housing.

4. The package according to claim 2, wherein the housing has a width between its side edges which is at most equal to the sum of the width of the base and the width of the welds.

5. The package according to claim 1, wherein the height of the base along at least one of the side ends is higher than or equal to half the mean thickness of the fin.

6. The package according to claim 1, wherein the outer wall element, the base and/or the fin comprise copper.

7. The package according to claim 1, wherein the base and the fin are integrally formed as a single piece.

8. The package according to claim 1, comprising:
   a neutron shield block and
   at least one heat conducting inner element,
   wherein the outer wall element is integral with or fixed to the heat conducting inner element, wherein the heat conducting inner element is in contact with a ferrule of the package,
   wherein the ferrule, the heat conducting inner element and the outer wall element surround at least partially the neutron shield block.

9. The package according to claim 1, wherein the cooling element comprises at least two fins and a base which is common to the fins,
   wherein the base extends on either side of the fin towards two opposite side ends of the base, wherein each of the ends is attached to the outer wall element via a weld.

10. The package according to claim 1, comprising a second cooling element which is attached to the outer wall element,
    wherein the second cooling element comprises at least one fin which is integral with or fixed to the base,
    wherein the distance between the cooling elements is lower than the height of at least one of the fins.

11. A heat conducting element for a package for transporting and/or storing radioactive materials, comprising:
a heat conducting inner element,
at least one cooling element, and
an outer wall element for forming an outer shell portion of the package, wherein the heat conducting inner element and the cooling element are located on either side of the outer wall element, wherein the outer wall element mechanically and thermally connects the heat conducting inner element to the cooling element,
wherein the cooling element comprises a base and at least one fin which is integral with or fixed to the base,
wherein the base extends on either side of the fin respectively towards two side ends opposite to the base, wherein each of the side ends is attached to the outer wall element via a weld.

12. A method for manufacturing a package for transporting and/or storing radioactive materials according to claim 1,
comprising a step of welding each of the two opposite side ends of the base to the outer wall element.

13. The manufacturing method according to claim 12, wherein the width of the base between its two side ends is higher than or equal to twice the mean thickness of the fin.

14. The manufacturing method according to claim 12, wherein the base is welded to the outer wall element by electron beam or by laser beam welding.

15. The manufacturing method according to claim 12, wherein the base is arranged in a housing provided in the outer wall element, wherein the base is welded in the housing along a thermal contact interface, wherein the thermal contact interface is tilted at an angle between 0° to 30° with respect to the height direction of the fin.

16. The manufacturing method according to claim 12, comprising a step of making notches in a plate to form fins of the cooling element, wherein the notches are spaced from each other along the longitudinal direction of the plate.

17. The manufacturing method according to claim 16, wherein the plate comprises the base of the cooling element,
wherein the step of welding the side ends of the base along the longitudinal direction of the plate occurs after the step of making the notches.

18. The manufacturing method according to claim 16, wherein the method comprises a step of twisting the fins about their longitudinal axis after the welding step.

* * * * *